US010761755B2

(12) United States Patent
Gong et al.

(10) Patent No.: US 10,761,755 B2
(45) Date of Patent: *Sep. 1, 2020

(54) METHOD AND APPARATUS FOR RECLAIMING MEMORY BLOCKS IN SNAPSHOT STORAGE SPACE (71) Applicant: EMC IP Holding Company LLC, Hopkinton, MA (US)

(72) Inventors: Chen Gong, Beijing (CN); Junping Frank Zhao, Beijing (CN); Lester Ming Zhang, Beijing (CN); Joe Jian Liu, Beijing (CN); Denny Dengyu Wang, Beijing (CN); Walter Lei Wang, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,528

(22) Filed: Sep. 20, 2016

(65) Prior Publication Data
US 2017/0090766 A1 Mar. 30, 2017

(30) Foreign Application Priority Data
Sep. 25, 2015 (CN) .......................... 2015 1 0663235

(51) Int. Cl.
G06F 3/06 (2006.01)
(52) U.S. Cl.
CPC ............ G06F 3/064 (2013.01); G06F 3/0608 (2013.01); G06F 3/0644 (2013.01); G06F 3/0652 (2013.01); G06F 3/0673 (2013.01)

(58) Field of Classification Search
CPC ...... G06F 3/064; G06F 3/0608; G06F 3/0653; G06F 3/0673
See application file for complete search history.

(56) References Cited

U.S. PATENT DOCUMENTS 7,979,395 B1 * 7/2011 Aggarwal ......... G06F 17/30138
707/649
8,140,821 B1 * 3/2012 Raizen ................ G06F 11/1448
707/637

(Continued)

Primary Examiner — Glenn Gossage
(74) Attorney, Agent, or Firm — Brian J. Colandreo; Mark H. Whittenberger; Holland & Knight LLP (57) ABSTRACT A method, apparatus, and computer program product for reclaiming one or more chunks in a snapshot storage space, are disclosed. The method comprises detecting one or more unused chunks in the snapshot storage space in response to a predefined trigger event, and reclaiming one or more detected unused chunks by providing the one or more detected unused chunks to a storage pool for reuse. One or more unused chunks may be detected by scanning a first mapping table that records a storage state of a plurality of chunks in the snapshot storage space, and a determination made whether the one or more detected unused chunks have been reclaimed. If the one or more detected unused chunks have not been reclaimed, the one or more detected unused chunks may be provided to the storage pool and a second mapping table updated to record a reclaiming state of the one or more unused chunks. A new snapshot may be stored using a chunk in the snapshot storage space that has not been used and has not been reclaimed yet.

9 Claims, 4 Drawing Sheets (56) References Cited

U.S. PATENT DOCUMENTS

| | | | |
|---|---|---|---|
| 8,862,639 B1* | 10/2014 | Rao | G06F 17/30309 |
| | | | 707/813 |
| 8,881,144 B1* | 11/2014 | Banerjee | G06F 9/461 |
| | | | 707/813 |
| 8,959,305 B1* | 2/2015 | Lecrone | G06F 12/023 |
| | | | 707/813 |
| 2010/0241820 A1* | 9/2010 | Pelts | G06F 3/0608 |
| | | | 711/170 |
| 2011/0208931 A1* | 8/2011 | Pendharkar | G06F 3/0608 |
| | | | 711/162 |
| 2012/0047108 A1* | 2/2012 | Mandel | G06F 3/0607 |
| | | | 707/639 |
| 2012/0059978 A1* | 3/2012 | Rosenband | G06F 3/0613 |
| | | | 711/103 |
| 2012/0278580 A1* | 11/2012 | Malige | G06F 12/02 |
| | | | 711/166 |
| 2014/0258657 A1* | 9/2014 | Schott | G06F 3/0608 |
| | | | 711/162 |
| 2017/0031772 A1* | 2/2017 | Subramanian | G06F 11/1451 |

\* cited by examiner

METHOD AND APPARATUS FOR RECLAIMING MEMORY BLOCKS IN SNAPSHOT STORAGE SPACE

RELATED APPLICATION

This application claims priority from Chinese Patent Application Number CN201510663235.3, filed on Sep. 25, 2015 at the State Intellectual Property Office, China, titled "METHOD AND APPARATUS FOR RECLAIMING MEMORY BLOCKS IN SNAPSHOT STORAGE SPACE," the contents of which is herein incorporated by reference in its entirety.

FIELD OF THE INVENTION

Various embodiments of the present disclosure relate to the field of data storage, and more specifically, relate to a method and an apparatus for reclaiming one or more chunks in a snapshot storage space.

BACKGROUND OF THE INVENTION

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

In view of one or more problems above and among other potential problems, various embodiments of the present disclosure provide a method and an apparatus for reclaiming one or more chunks in a snapshot storage space.

According to a first aspect of the present disclosure, there is provided a method, system, and/or computer program product for reclaiming one or more chunks in a snapshot storage space, the method comprising: detecting one or more unused chunks in the snapshot storage space in response to a predefined trigger event; and providing the one or more detected unused chunks to a storage pool for reuse.

BRIEF DESCRIPTION OF THE PREFERRED EMBODIMENTS

Through more detailed depiction of the exemplary embodiments of the present disclosure below in conjunction with the accompanying drawings, the above and other objectives, features, and advantages of the present disclosure will become more apparent, wherein the same reference numerals generally represent same components in the exemplary embodiments of the present disclosure.

DETAILED DESCRIPTION OF THE PREFERRED EMBODIMENTS

Hereinafter, preferred embodiments of the present disclosure will be described in more detail with reference to the accompanying drawings. Although the accompanying drawings show preferred embodiments of the present disclosure, it should be understood that the present disclosure may be implemented in various manners and should not be limited by the embodiments illustrated here. On the contrary, these embodiments are provided for making the present disclosure more thorough and complete, and conveying the scope of the present disclosure more completely to those skilled in the art.

In recent years, typically, thin provisioned storage configuration has been widely used because it allows a user to efficiently utilize a storage space. Generally, in a storage system that employs the thin provisioned storage configuration (e.g., thin provisioned LUN (Logical Unit Number) slice), one or more file systems and snapshots of the file systems are created based on an actual storage device with a certain storage capacity, wherein a sum of sizes of the storage spaces provided for the created file systems and snapshots may be greater than the storage capacity of the actual storage device. Traditionally, the storage space for the actual storage device may be regarded as a storage pool that is shared by the created file systems according to actual storage needs. Conventionally, such configuration facilitates extending the actual storage device based on needs of the user of the file systems with respect to the storage capacity, obviating a need of further modifying the settings of the file system.

Traditionally, snapshot generally refers to a complete available copy of a Production File System (hereinafter referred to as PFS) with respect to a designated data set. Typically, the copy includes a mirror of corresponding data at a certain time point (the time point when the copy starts), which enables fast data recovery in the case of logic error or file damage occurring to the storage device, e.g., recovering data to a state of a certain available time point. Generally, snapshots have a wide application, e.g., used as a source for a backup, a source for data mining, a checkpoint for saving application states, and even as a means of pure data replication.

Typically, in a conventional storage system based on the thin provisioned storage configuration, a snapshot storage space can only be used for storing snapshots, and cannot be used for storing other file systems or data. In other words, traditionally, even if snapshots in one or more storage chunks of the snap storage space are deleted, such storage chunks cannot be re-used by other file systems or data, and can only be used when creating new snapshots. In actual applications, generally, this is not good for efficient utilization of the storage pool of storage devices.

Therefore, conventionally, a technical solution capable of reclaiming one or more chunks in a snapshot storage space is desirable in the data storage industry.

In view of one or more problems above and among other potential problems, various embodiments of the present disclosure provide a method and an apparatus for reclaiming one or more chunks in a snapshot storage space.

According to a first aspect of the present disclosure, there is provided a method for reclaiming one or more chunks in a snapshot storage space, comprising: detecting one or more unused chunks in the snapshot storage space in response to a predefined trigger event; and providing the one or more detected unused chunks to a storage pool for reuse.

In one embodiment of the present disclosure, the predefined trigger event comprises at least one of a user scanning request and time expiration triggering.

In one embodiment of the present disclosure, detecting the one or more unused chunks in the snapshot storage space further comprises: scanning a first mapping table 44 that records a storage state of a plurality of chunks in the snapshot storage space to determine the one or more unused chunks in the snapshot storage space, wherein each value in the first mapping table 44 represents whether a corresponding chunk in the snapshot storage space is used or unused.

In one embodiment of the present disclosure, the method further comprises: after providing the one or more detected unused chunks to the storage pool, updating, in a second mapping table 46 that records a reclaiming state of a plurality of chunks in the snapshot storage space, the reclaiming state of the one or more unused chunks, wherein each value in the second mapping table 46 represents whether a corresponding chunk in the snapshot storage space has been reclaimed or not reclaimed.

In one embodiment of the present disclosure, the method further comprises: determining whether the one or more detected unused chunks have been reclaimed, and wherein providing the one or more detected unused chunks to the storage pool comprises: providing the one or more detected unused chunks to the storage pool if the one or more detected unused chunks have not been reclaimed.

In one embodiment, the method further comprises: storing a new snapshot using a chunk in the snapshot storage space that has not been used and has not been reclaimed yet.

In one embodiment of the present disclosure, the method further comprises: before providing the one or more detected unused chunks to the storage pool, locking the one or more detected unused chunks for the snapshot storage space.

According to a second aspect of the present disclosure, there is provided an apparatus for reclaiming one or more chunks in a snapshot storage space, comprising: a detecting unit configured to, in response to a predefined trigger event, detect one or more unused chunks in the snapshot storage space; and a provisioning unit configured to provide the one or more detected unused chunks to a storage pool for reuse.

In one embodiment of the present disclosure, the predefined trigger event comprises at least one of a user scanning request and time expiration triggering.

In one embodiment of the present disclosure, the detecting unit is further configured to: scan a first mapping table 44 that records a storage state of a plurality of chunks in the snapshot storage space to determine the one or more unused chunks in the snapshot storage space, wherein each value in the first mapping table 44 represents whether a corresponding chunk in the snapshot storage space is used or unused.

In one embodiment of the present disclosure, the apparatus further comprises: an updating unit configured to, after the one or more detected unused chunks are provided to the storage pool, update, in a second mapping table 46 that records a reclaiming state of a plurality of chunks in the snapshot storage space, the reclaiming state of the one or more unused chunks, wherein each value in the second mapping table 46 represents whether the corresponding chunk in the snapshot storage space has been reclaimed or not reclaimed.

In one embodiment of the present disclosure, the apparatus further comprises: a determining unit configured to determine whether the one or more detected unused chunks have been reclaimed, and wherein the provisioning unit is further configured to provide the one or more detected unused chunks to the storage pool if the one or more detected unused chunks have not been reclaimed.

In one embodiment, the apparatus further comprises: an allocating unit configured to store a new snapshot using a chunk in the snapshot storage space that has not been used and has not been reclaimed yet.

In one embodiment of the present disclosure, the apparatus further comprises: a locking unit configured to, before the one or more detected unused chunks are provided to the storage pool, lock the one or more detected unused chunks for the snapshot storage space.

According to a third aspect of the present disclosure, there is provided a computer readable storage medium that has computer readable program instructions stored thereon for executing steps of the method described above.

It will be understood through the depiction below that according to the embodiments of the present disclosure, when one or more unused storage chunks are detected in the snapshot storage space, the one or more chunks are returned to the storage pool, such that the one or more chunks can be reused by all file systems sharing the storage pool or used for storing other data, thereby achieving efficient utilization of the storage space of the storage pool.

Figure 1:
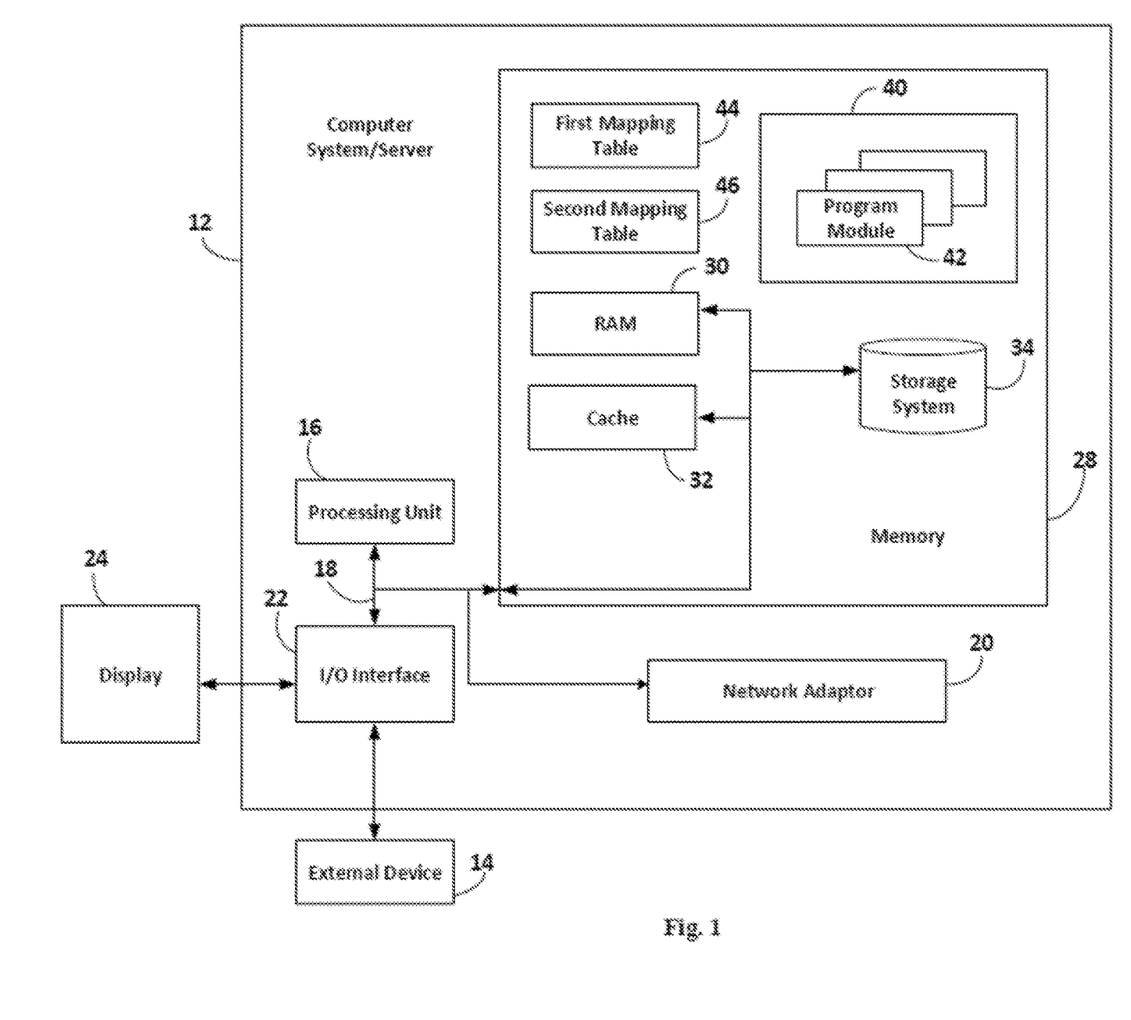
FIG. 1 illustrates a block diagram of an exemplary computer system/server adapted to implement the embodiments of the present disclosure.

FIG. 1 shows a block diagram of an exemplary computer system/server 12 adapted to implement embodiments of the present disclosure. The computer system/server 12 as shown in FIG. 1 is only an example, which should not bring any limitation to the functions and scope of use of the embodiments of the present disclosure.

As shown in FIG. 1, the computer system/server 12 is embodied in a manner of a general computing device. Components of the computer system/server 12 may include, but are not limited to: one or more processors or processing units 16, a system memory 28, a bus 18 for connecting different system components (including the system memory 28 and the processing unit(s) 16).

The bus 18 indicates one or more of several bus structures, including a memory bus, a peripheral bus, an accelerated graphics port, a processor bus, or a local area bus using any bus structure in a variety of bus structures. For example, these hierarchical structures include, but are not limited to, an Industry Standard Architecture (ISA) bus, a Micro Channel Architecture (MCA) bus, an enhanced ISA bus, a Video Electronics Standards Association (VESA) local area bus, and a Peripheral Component Interconnect (PCI) bus.

The computer system/server 12 typically comprises a plurality of computer system readable mediums or media. These mediums may be any available medium that can be accessed by the computer system/server 12, including volatile and non-volatile mediums, mobile (portable) and immobile (stationary) mediums.

The system memory 28 may comprise a computer readable medium (or media) in the form of a volatile memory, e.g., a random access memory (RAM) 30 and/or a cache 32. The computer system/server 12 may further comprise another mobile/immobile (portable/stationary), volatile/nonvolatile computer storage medium. Only as an example, the storage system 34 may be used for reading/writing stationary and non-volatile magnetic mediums (not shown in FIG. 1, generally referred to as "hard-disk drives"). Although not shown in FIG. 1, a disk drive for reading/writing a mobile (portable) non-volatile disk (e.g., "floppy disk") and an optical disk drive for reading/writing a mobile (portable) non-volatile optical disk (e.g., compact disc-read only memory (CD-ROM), digital versatile disk-read only memory (DVD-ROM) or other optical medium) may be provided. In these cases, each drive may be connected to the bus 18 via one or more data medium interfaces. The memory 28 may include at least one program product that has a set of program modules (e.g., at least one). These program modules are configured to perform functions of various embodiments of the present disclosure.

A program/utility tool 40 having a set of program modules 42 (at least one) may be stored in for example the memory 28. This program module 42 includes, but is not limited to, an operating system, one or more applications, other program modules, and program data. Each, or a certain combination, of these examples likely includes implementation in a network environment. The program module 42 generally performs the functions and/or methods in the embodiments as described in the present disclosure.

Dependent on the needs, the computer system/server 12 may also communicate with one or more external devices (e.g., a display 24, an external device 14, etc.), and may also communicate with one or more devices that cause the user to interact with the computer system/server 12, and/or communicate with any device (e.g., a network card, a modem, etc.) that causes the computer system/server 12 to communicate with one or more other computing devices. This communication may be carried out through an input/output (I/O) interface 22. Moreover, the computer system/server 12 may also communicate with one or more networks (e.g., a local area network (LAN), a wide area network (WAN) and/or a public network, e.g., Internet) via a network adaptor 20. As shown in the figure, the network adaptor 20 communicates with other modules of the computer system/server 12 via the bus 18. It should be understood that although not shown in the figure, other hardware and/or software modules may be used in conjunction with the computer system/server 12, including, but not limited to: microcode, device driver, redundancy processing unit, external disk drive array, RAID system, magnetic tape drive, and data backup storage system, etc.

In the depiction of the exemplary embodiments, the term "comprise" and its similar expressions represent an open inclusion, i.e., "including, but not limited to." The term "based on" represents "at least partially based on." The term "one embodiment" or "the embodiment" represents "at least one embodiment."

Hereinafter, the embodiments of the present disclosure will be described in detail. It will be understood through the depiction below that one of the basic concepts of the present disclosure lies in detecting one or more unused chunks by scanning a snapshot storage space (the storage chunk was previously obtained from a storage pool for storing the snapshot, and afterwards, the snapshot in the storage chunk is deleted, such that the chunk is idle). When the one or more unused chunks are detected, the chunk will be returned to the storage pool such that the chunk can be reused by all file systems sharing the storage pool or used for storing other data. Therefore, according to the technical solution of the embodiments of the present disclosure, the one or more unused chunks in a file system can be reclaimed for reuse. This increases efficient utilization of the storage pool.

Figure 2:
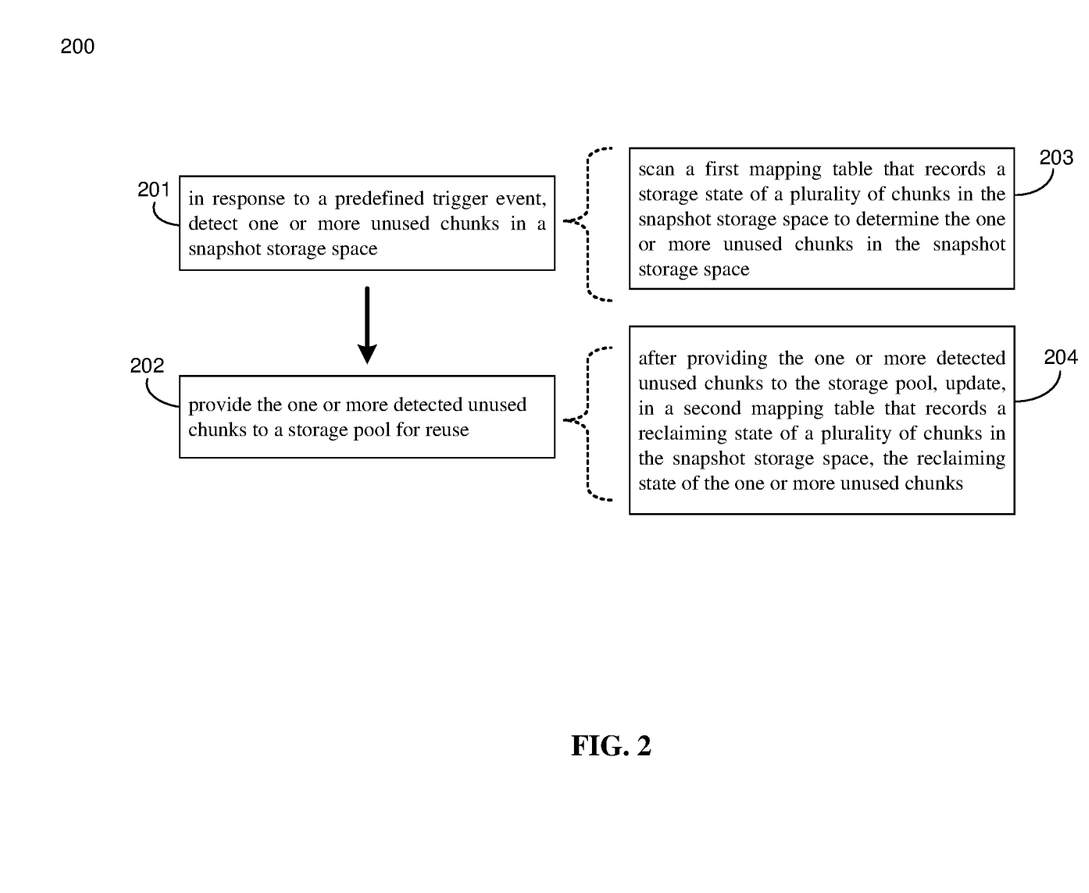
FIG. 2 illustrates a flow diagram of a method for reclaiming one or more chunks in a snapshot storage space according to the embodiments of the present disclosure.

FIG. 2 illustrates a flow diagram of a method 200 for reclaiming a chunk in a snapshot storage space according to the embodiments of the present disclosure. The snapshot storage space may be built on a thin-provisioned LUN and share a storage pool with other file systems. It should be noted that the method 200 may also comprise additional steps and/or omit execution of the illustrated steps. The scope of the present disclosure is not limited in this aspect.

In step 201, in response to a predefined trigger event, detect an unused chunk in the snapshot storage space.

In the embodiments of the present disclosure, as mentioned above, one or more unused chunks refers to one or more chunks that were previously obtained from a storage pool for storing a snapshot and from which the snapshot is later deleted. In the traditional thin-provisioned storage system, an idle chunk existing in the snapshot storage space will not be identified or automatically return to the storage pool for reuse.

In order to reuse these one or more unused chunks so as to enhance utilization of the storage system, the embodiments of the present disclosure may scan the snapshot storage space to detect the one or more unused chunks. The scanning may respond to a predefined trigger event. In some embodiments, the trigger event may be selected or defined by a user of a file system and may comprise at least one of user's scan request or time expiration triggering.

In the embodiment where the trigger event is the user's scan request, scanning the snapshot storage space starts to be carried out upon reception of the user's scan request. In this way, the user may trigger the scan whenever required.

In the embodiment where the trigger event is the time expiration triggering, a trigger cycle of the scan may be defined. The trigger cycle may be one day, one week, or one month, and the like. Meanwhile, a trigger time period for performing scanning may also be defined, e.g., 0:00 am-2:00 am. Therefore, scanning automatically starts when it is detected to reach the predefined trigger cycle and/or trigger time period.

Figure 3:
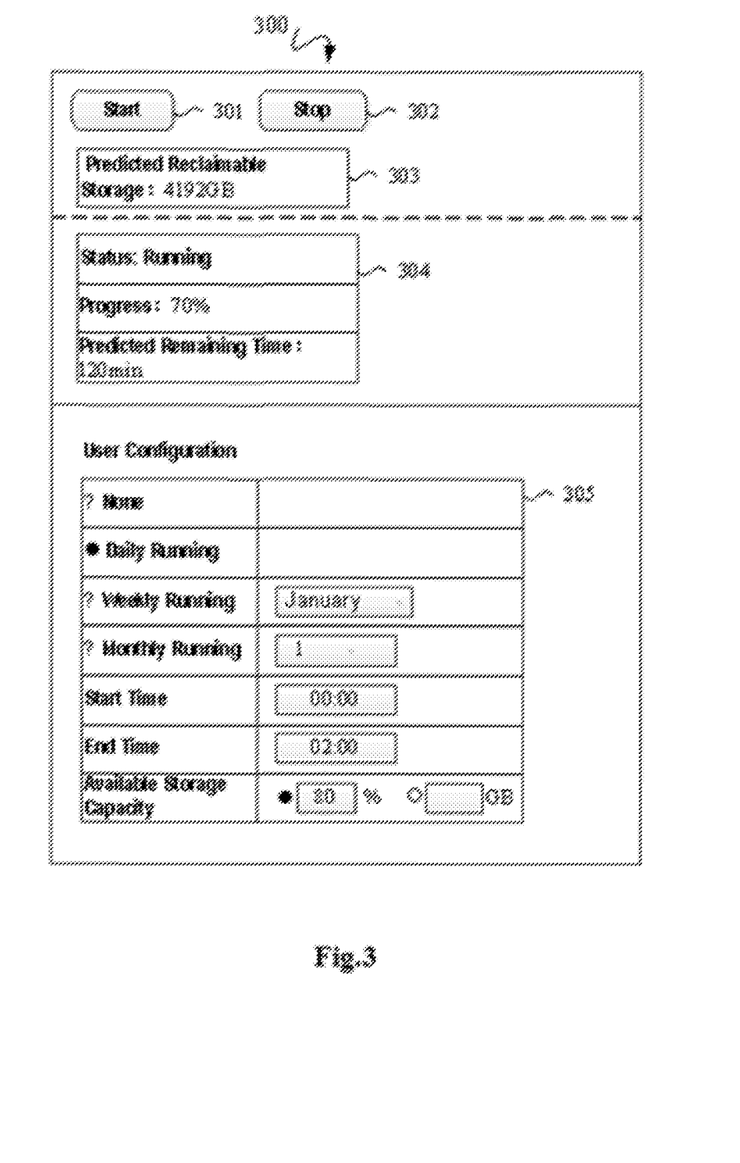
FIG. 3 illustrates a schematic diagram of a graphical user interface (GUI) for carrying out scanning a snapshot storage space according to an exemplary embodiment of the present disclosure.

FIG. 3 illustrates a schematic diagram of a graphical user interface (GUI) for carrying out scanning a snapshot storage space according to an exemplary embodiment of the present disclosure. In the GUI 300, icons 301 and 302 may be clicked by the user to start a scanning process or end the scanning process. Box 303 shows a predicted reclaimable storage capacity. The state table 304 shows a state of the scanning process, e.g., whether the scanning process is running, its progress, and predicted remaining time. The user configuration table 305 shows a trigger event customized by the user for triggering a scanning process. As illustrated in FIG. 3, the scanned trigger event may include time expiration triggering, e.g., carrying out scanning the snapshot storage space 0:00-2:00 every day to detect an idle chunk.

It should be noted that FIG. 3 illustrates an exemplary graphical user interface. During the use process, the graphical user interface may be designed into other patterns or may include more or less functions. The embodiments of the present disclosure are not limited in this aspect.

In one embodiment of the present disclosure, detecting the one or more unused chunks in the snapshot storage space further comprises: scanning 203 a first mapping table 44 that records a storage state of a plurality of chunks in the snapshot storage space to determine the one or more unused chunks in the snapshot storage space, wherein each value in the first mapping table 44 represents whether a corresponding chunk in the snapshot storage space is used or unused. For example, the first mapping table 44 may use 0 to represent the unused state of the corresponding chunk, and use 1 to represent the used state of the corresponding chunk. In detecting the one or more unused chunks in the snapshot storage space, entries having a value 0 in the first mapping table 44 are scanned, thereby determining that the corresponding chunk is in an unused state.

If one or more unused chunks are detected in step 201, the method 200 proceeds to step 202. In step 202, the one or more detected unused chunks are provided to the storage pool for reuse.

In one embodiment of the present disclosure, when one or more unused chunks are detected, the one or more unused chunks are de-mapped from the snapshot storage space, and the one or more de-mapped chunks are provided to the storage pool. For example, when one or more unused chunks are detected, a de-mapping command may be sent to a storage device of the storage pool (e.g., via an "UNMAP" command of an SCSI (Small Computer System Interface). The storage device may punch hole to the one or more chunks, such that the one or more chunks are de-mapped from the snapshot storage space and returned to the chunk for reuse.

During punching hole to the one or more chunks, i.e., after carrying out detecting the one or more unused chunks and before putting the one or more chunks into the storage pool for reuse, in order to prevent an input/output (I/O) thread from continuing allocating the one or more chunks, the one or more unused chunks may be locked for the snapshot storage space, such that the one or more locked chunks will not be allocated for storing the snapshot. Therefore, normal operation of reading/writing for the file system or other data is guaranteed during the chunk reclaiming process.

In the embodiments of the present disclosure, after one or more unused chunks are provided to the storage pool, the one or more chunks may be reused by all file systems sharing the storage pool or used for storing other data.

In the embodiments of the present disclosure, after the one or more detected unused chunks are provided to the storage pool, a reclaiming state of the one or more unused chunks may be updated 204 in a second mapping table 46 for recording the reclaiming state of a plurality of chunks in the snapshot storage space. Each value in the second mapping table 46 may represent whether the corresponding chunk in the snapshot storage space has been reclaimed or have not been reclaimed. For example, in the second mapping table 46, 0 may be used to represent a state in which a corresponding chunk has not been reclaimed, while 1 is used to represent a state in which a corresponding chunk has been reclaimed. After the one or more detected unused chunks are provided to the storage pool, an entry in the second mapping table 46 corresponding to the chunk may be updated to 1, to indicate that the one or more chunks have been reclaimed.

In the embodiments of the present disclosure, after the one or more unused chunks in the snap storage space are detected, it may be determined whether the one or more detected unused chunks have been reclaimed; and if the one or more detected unused chunks have not been reclaimed yet, the one or more detected unused chunks will be provided to the storage pool. Through this operation, during each reclaiming process, only the one or more unused chunks that have not been reclaimed are reclaimed, while the one or more unused chunks that were reclaimed previously will not be reclaimed again. In this way, the amount of chunks that need to be reclaimed during each reclaiming procedure can be reduced, thereby enhancing the reclaiming efficiency.

In the embodiments of the present disclosure, when a new snapshot is created, the new snapshot may be stored using, in priority, a chunk that has not been used in the snapshot storage space and has not been reclaimed. For example, a chunk with a value 0 in the first storage table and also a value 0 in the second storage table may be used to store a new snapshot. For those chunks that have a value 0 in the first storage table and a value 1 in the second storage table, they are not used for storing newly created snapshots.

An exemplary method for reclaiming a chunk in a snapshot storage space according to the embodiments of the present disclosure has been described above with reference to FIG. 3. Each step of the method may be executed by a computing device that runs the file system. The computing device may be for example the computer system as illustrated in FIG. 1.

The spirit and principle of the present disclosure has been illustrated above with reference to a plurality of embodiments. In the various embodiments of the present disclosure above, one or more unused chunks are detected by scanning a snapshot storage space. When one or more unused chunks are detected, the one or more chunks will be returned to the storage pool such that the one or more chunks can be reused by all file systems sharing the storage pool or used for storing other data, which achieves efficient utilization of the storage space of the storage pool. The procedure for reclaiming one or more chunks of the snapshot storage space may be automatically triggered according to a predetermined trigger policy so as to timely and quickly reuse an idle chunk. Besides, the procedure will not affect normal reading writing operations of the file system.

Figure 4:
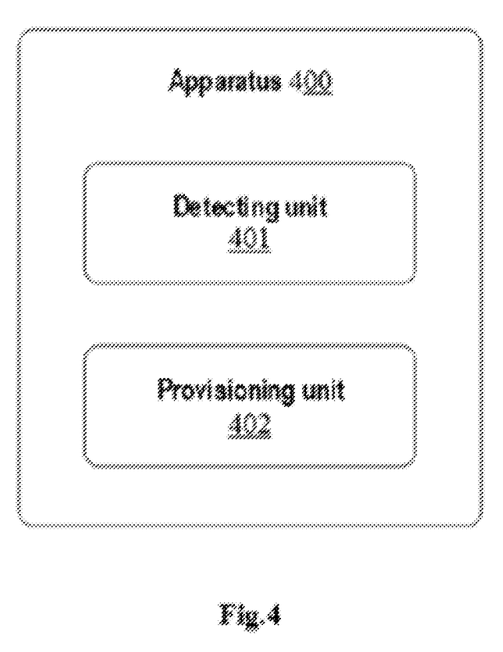
FIG. 4 illustrates a block diagram of an apparatus for reclaiming one or more chunks in a snapshot storage space according to the embodiments of the present disclosure.

FIG. 4 illustrates a block diagram of an apparatus 400 for reclaiming one or more chunks in a snapshot storage space according to the embodiments of the present disclosure. The snapshot storage space may be built on the thin provisioned LUN and share a storage pool with other file systems. As illustrated in FIG. 4, the apparatus 400 may comprise a detecting unit 401 configured to detect one or more unused chunks in the snapshot storage space in response to a predefined trigger event; and a provisioning unit 402 configured to provide the one or more detected unused chunks to a storage pool for reuse.

In one embodiment of the present disclosure, the predefined trigger event comprises at least one of a user scanning request and time expiration triggering.

In one embodiment of the present disclosure, the detecting unit 401 is further configured to scan 203 a first mapping table 44 that records a storage state of a plurality of chunks in the snapshot storage space to determine the one or more unused chunks in the snapshot storage space. Each value in the first mapping table 44 represents whether a corresponding chunk in the snapshot storage space is used or unused. For example, in the first mapping table 44, 0 may be used to represent an unused state of a corresponding chunk, while 1 is used to represent a used state of a corresponding chunk. When detecting the one or more unused chunks in the snapshot storage space, entries with a value 0 in the first mapping table 44 are scanned so as to determine that the corresponding chunk is in an unused state.

In one embodiment of the present disclosure, the apparatus 400 may further comprise: an updating unit configured to, after the one or more detected unused chunks are provided to the storage pool, update 204, in a second mapping table 46 that records a reclaiming state of a plurality of chunks in the snapshot storage space, the reclaiming state of the one or more unused chunks. Each value in the second mapping table 46 represents whether a corresponding chunk in the snapshot storage space has been reclaimed or not reclaimed. For example, in the second mapping table 46, 0 may be used to represent a state in which a corresponding chunk has not been reclaimed, while 1 is used to represent a state in which a corresponding chunk has been reclaimed. After the one or more detected unused chunks are provided to the storage pool, an entry in the second mapping table 46 corresponding to the chunk may be updated to 1, to indicate that the one or more chunks have been reclaimed.

In one embodiment of the present disclosure, the apparatus 400 may further comprise: a determining unit configured to determine whether the one or more detected unused chunks have been reclaimed. If the determining unit determines that one or more detected unused chunks have not been reclaimed, the provisioning unit 402 provides the one or more detected unused chunks to the storage pool. Through this operation, during each reclaiming process, only the one or more unused chunks that have not been reclaimed are reclaimed, while the one or more unused chunks that were reclaimed previously will not be reclaimed again. In this way, the amount of chunks that need to be reclaimed during each reclaiming procedure can be reduced, thereby enhancing the reclaiming efficiency.

In one embodiment, the apparatus 400 may further comprise an allocating unit configured to store a new snapshot using one or more chunks in the snapshot storage space that have not been used and have not been reclaimed yet. For example, a chunk with a value 0 in the first storage table and also a value 0 in the second storage table may be used to store a new snapshot. For those chunks that have a value 0 in the first storage table and a value 1 in the second storage table, they are not used for storing newly created snapshots.

In one embodiment of the present disclosure, the apparatus further comprises a locking unit configured to, before the one or more detected unused chunks are provided to the storage pool, lock the one or more detected unused chunks for the snapshot storage space.

It may be seen that the apparatus 400 may implement the method shown in FIG. 2, and although not further illustrated, the apparatus 400 may comprise more functional units to implement a plurality of embodiments of the method 200 described in conjunction with FIG. 2.

It should be noted that for the sake of clarity, FIG. 4 does not show optional units or sub-units included in the apparatus 400. All features and operations as described above are suitable for apparatus 400, respectively, which are therefore not detailed here. Moreover, partitioning of units or subunits in apparatus 400 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 400 may be implemented by various manners, including software, hardware, firmware or a random combination thereof. For example, in some embodiments, the apparatus may be implemented by software and/or firmware. Alternatively or additionally, the apparatus 400 may be implemented partially or completely based on hardware. for example, one or more units in the apparatus 400 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, executed via the processor of the computer or other programmable data processing apparatus, implement the functions/acts in the flowchart and/or block diagram block or blocks. These computer readable program instructions may also be stored in or on a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of reclaiming one or more chunks in a snapshot storage space, comprising:
    defining, via a computing device, a predefined trigger event;
    detecting, via the computing device, one or more unused chunks in the snapshot storage space in response to the predefined trigger event, wherein the detecting comprises scanning, via the computing device, a first mapping table that records a storage state of a plurality of chunks in the snapshot storage space to determine the one or more unused chunks in the snapshot storage space, a value in the first mapping table representing whether a corresponding chunk in the snapshot storage space is used;
    de-mapping, via the computing device, the one or more unused chunks from the snapshot storage space;
    reclaiming, via the computing device, the one or more detected unused chunks by providing the one or more detected unused chunks to a storage pool for reuse; and
    after providing the one or more detected unused chunks to the storage pool, updating, via the computing device, in a second mapping table that records a reclaiming state of a plurality of chunks in the snapshot storage space, the reclaiming state of the one or more detected unused chunks, each value in the second mapping table representing whether a corresponding chunk in the snapshot storage space has been reclaimed or not reclaimed.

2. The method according to claim 1, wherein the predefined trigger event comprises at least one of a user scanning request or time expiration triggering.

3. The method according to claim 1, further comprising:
    determining, via the computing device, whether the one or more detected unused chunks have been reclaimed, wherein providing the one or more detected unused chunks to the storage pool comprises providing the one or more detected unused chunks to the storage pool if the one or more detected unused chunks have not been reclaimed.

4. The method according to claim 1, further comprising:
    prior to providing the one or more detected unused chunks to the storage pool, locking, via the computing device, the one or more detected unused chunks for the snapshot storage space.

5. The method according to claim 1, further comprising:
    storing the new snapshot using a chunk in the snapshot storage space that has not been used and has not been reclaimed yet.

6. A computer program product for reclaiming one or more chunks in a snapshot storage space, the computer program product comprising:
    a non-transitory computer readable medium encoded with computer-executable code, wherein the code, when executed, causes one or more processors to perform the operations of:
        defining, via a computing device, a predefined trigger event;
        detecting, via the computing device, one or more unused chunks in the snapshot storage space, in response to the predefined trigger event, wherein the one or more unused chunks is an idle chunk, wherein the detecting comprises scanning, via the computing device, a first mapping table that records a storage state of a plurality of chunks in the snapshot storage space to determine the one or more unused chunks in the snapshot storage space, a value in the first mapping table representing whether a corresponding chunk in the snapshot storage space is used;

de-mapping, via the computing device, the one or more unused chunks from the snapshot storage space;

reclaiming, via the computing device, the one or more detected unused chunks by providing the one or more detected unused chunks to a storage pool for reuse; and after providing the one or more detected unused chunks to the storage pool, updating, via the computing device, in a second mapping table that records a reclaiming state of a plurality of chunks in the snapshot storage space, the reclaiming state of the one or more detected unused chunks, each value in the second mapping table representing whether a corresponding chunk in the snapshot storage space has been reclaimed or not reclaimed.

7. The computer program product according to claim 6, wherein the predefined trigger event comprises at least one of a user scanning request or time expiration triggering.

8. The computer program product according to claim 6, wherein the code, when executed, further causes the one or more processors to perform the operations of:

determining, via the computing device, whether the one or more detected unused chunks have been reclaimed, and wherein providing the one or more detected unused chunks to the storage pool comprises providing the one or more detected unused chunks to the storage pool if the one or more detected unused chunks have not been reclaimed.

9. The computer program product according to claim 6, wherein the code, when executed, further causes the one or more processors to perform the operation of:

storing a new snapshot using a chunk in the snapshot storage space that has not been used and has not been reclaimed yet.

\* \* \* \* \*